INVENTOR.
HARRY DE FURIA

United States Patent Office 2,924,557
Patented Feb. 9, 1960

2,924,557

RECLAMATION SYSTEM FOR VOLATILE SOLVENTS AND APPARATUS THEREFOR

Harry De Furia, Nutley, N.J., assignor, by mesne assignments, to Forse Corporation, Anderson, Ind., a corporation of Indiana Application October 21, 1954, Serial No. 463,752

4 Claims. (Cl. 202—170)

The present invention relates to a system for reclaiming volatile solvents which have become contaminated and to apparatus useful in such a system, and more particularly to a system and apparatus for reclaiming contaminated synthetic solvent which has been used in dry cleaning systems.

In current dry cleaning installations it is customary to use a solvent like perchlorethylene into which soiled garments are immersed to be cleaned. In order to use this solvent over again, it is circulated through a filter, preferably continuously, in order to remove soiled substances and contamination from the solvent which the solvent has picked up from the garments to be cleaned. The capacity of such filters is usually matched to the cleaning capacity of the washing or cleaning machines employed. In continuous use, the filter picks up more and more contaminating substances, such as dirt, solid particles, etc.; the efficiency of the filter decreases rapidly after a certain point of contamination of the fluid is exceeded. To re-activate the filter, and to reestablish efficient operation thereof, the operator of the dry cleaning system is forced to shut down the filter and remove the sludge which has collected on the filter element. The filter may be cleaned by removing the sludge manually, or by reversing the flow through the filter. Still another method is to force air into the filter to separate the sludge from the filter elements. The sludge is then allowed to settle to the bottom of the filter. It is removed therefrom by closing the filter outlet valve and opening the sludge cleanout valve, and then forcing the sludge out of the filter. This sludge is usually laden with cleaning fluid, is evil smelling, dirty, and disagreeable to handle. Yet it cannot be conveniently discarded because it is still saturated with cleaning fluid which would have to be replaced in the system at considerable expense to the operator; further, disposal problems are created by the fumes given off by the solvent remaining in the sludge. In methods previously commonly employed, the sludge was removed from the filter and then placed in a porous bag which was allowed to drip into a container so as to recover the largest amount possible of the cleaning fluid therefrom. However, even after the sludge had been left to drip it still contained a certain amount of cleaning fluid. In view of this loss at each cleanout of the filter, and in view of the disagreeable and dirty task which was involved, the tendency has been to delay cleaning the filter sometimes beyond the point of most efficient operation thereof. In other systems, the sludge removed from the filter was manually transferred to a still to reclaim solvent therefrom involving the same disagreeable and dirty manual operation.

It is accordingly an object of the present invention to provide a closed system which is not open to the atmosphere, whereby the escape of noxious fumes is prevented, and which makes manual handling of cleaning fluid, or sludge containing fluid, unnecessary.

It is an important object of the present invention to provide a closed distillation system which forces the operator to periodically distill the sludge removed from the filter, so that unskilled or careless operators cannot inadvertently allow the solvent used in the cleaning system to become contaminated or to lose its proper chemical condition and balance.

It is a further object of the present invention to provide a distillation apparatus for use in reclaiming contaminated solvents which can be directly connected by means of pipes or other closed conduits such as tubing, hoses, and the like, into the existing system of a dry cleaning installation and yet permit prompt re-use of solvent without necessity of distilling all the solvent used in cleaning the filter.

Still other objects of the present invention are to provide a steam jacket or steam bottom for a vessel, such as a distillation chamber, which is mechanically strong, capable of withstanding considerable steam pressure, and yet light of weight, and a method of manufacturing such a steam jacket, which is simple and cheap.

According to the present invention, I provide a closed filtration and distillation system for fluids forming noxious fumes and a distillation unit useful therein, which system includes a fluid supply tank, a fluid pressure pump, and a filter connected to the fluid tank. The distillation unit, which includes an evaporation chamber and a superposed condensing dome is connected by means of a pipe to the filter cleanout coupling. A vent connection, preferably located at substantially the same level as the inlet of the pipe connection, is provided to permit the escape of noxious fumes which occur due to the turbulence of the contaminated solvent in the sludge as it is being pumped into the distillation unit. This vent connection is preferably connected back to the fluid supply tank through a conventional trap to prevent escape of noxious vapors, or loss of solvent vapors; however, this vent may be led to outside atmosphere if the highest degree of efficiency of the installation is not desired and if health considerations permit. A tap off connection is provided below the inlet of the pipe, which tap off connection leads back to the solvent supply tank. A sight glass arranged along the evaporating chamber permits inspection of the level and condition of the contents thereof.

To make fullest use of the closed filtration and distillation system, the sequence of operation thereof would include pumping of sludge and contaminated solvent from the filter into the distillation system at the end of the working day after cleaning or "blowoff" of the filter. At the beginning of the next working day suspended contaminating substances will have settled out to the bottom of the chamber, and cleaning substance which can be handled easily by the filter can be drawn off through the tap as determined by inspection through the sight glass, returned to the supply tank and reused. At the end of the day the same procedure may be repeated, permitting daily cleanout of the filter without manual handling of the sludge and without loss of any solvent through evaporation or discarding of sludge. After a while the distillation chamber will have accumulated a certain amount of concentrated sludge with solvent soaked up therein, and distillation becomes necessary in order to reclaim the solvent. It is unnecessary, however, to heat the whole contents of the chamber since distillation of the most contaminated residue only usually is necessary; relatively clean settled out solvent may be drained off through the tap. The distillation can be carried out by means of the present apparatus to such an extent that the residue left which has to be manually removed is of powdery consistency without any solvent therein. This has been verified by actual test.

According to a further feature of the invention I provide a structure of a steam jacket, or steam bottom for steam heating the distillation unit, and a method of manufacturing same. It has been found that a considerable amount of material can be saved and the outward appearance of the unit enhanced by making the steam chamber of firebox steel and welding a cylindrical evaporating chamber housing thereto. According to the present invention, the bottom of the distillation chamber, forming also the top plate of the steam chamber, has a plurality of studs welded thereto in accordance with well known practise in making steam jackets. A template is used to locate the position of the studs. This same, or a like template is employed in forming holes into a dished, or cupped plate, which is assembled over the bottom plate with the studs thereon. The holes in the dished or cupped cover are preferably of slightly smaller size than the cross sectional outline of the studs, so that the studs close off the holes from underneath. The plate and the dished plate are then united around their meeting edge; and the studs and the dished plate are joined by welding the underlying studs to the dished plate around the edge of the hole. The resulting construction is both light in weight and requires a minimum of precision machining and handling, and only one punching or drilling operation is necessary in the assembly thereof.

The details of the invention, and its construction and method of operation and assembly, together with additional features and advantages thereof will best be understood from the following description of specific embodiments of the invention as applied to a dry cleaning system.

Figure 1:
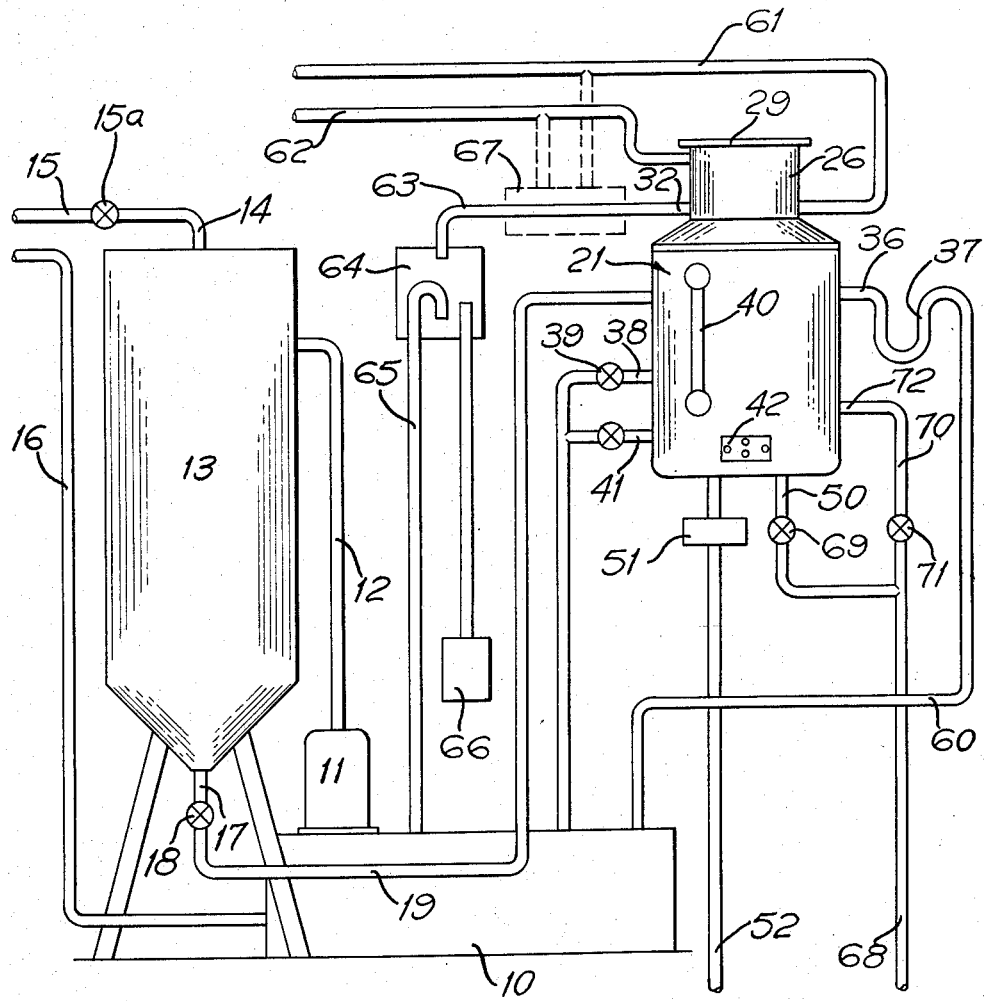
Fig. 1 is a schematic connection diagram of the closed dry cleaning solvent distillation system illustrating the interconnection of the various elements.
Figure 2:
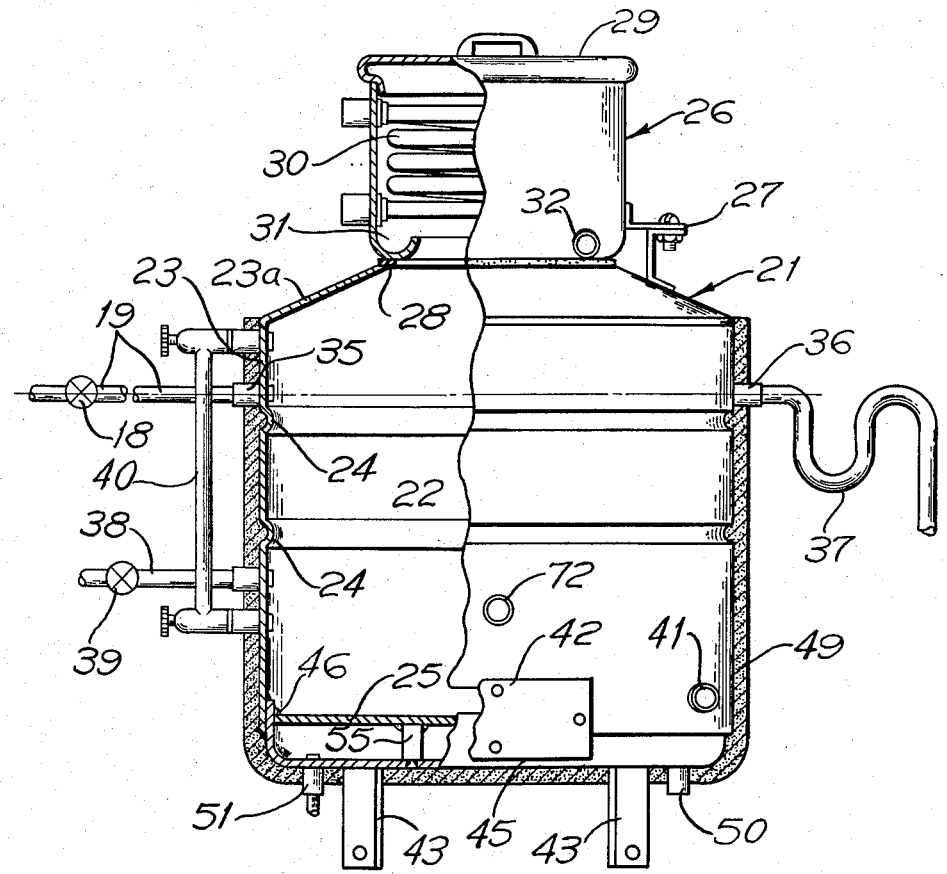
Fig. 2 is a vertical plan view partly in section, of the distillation unit according to the present invention.

Referring first to Fig. 1 of the drawings, I have shown a fluid tank 10 to hold dry cleaning solvent such as perchlorethylene to be used in the dry cleaning system. A pump 11 pumps solvent from the tank 10 through pipe 12 into a filter unit 13; this filter unit is of conventional design, and is arranged to handle the amount of solvent used in the installation for which it is designed. The outlet 14 of the filter is connected through a pipe 15 having valve 15a to the cleaning machines wherein the solvent is used. The solvent is returned to tank 10 from the cleaning machines through pipe 16 contaminated by dirt and other substances picked up from the garments to be cleaned. It is therefore seen that the contaminated solvent is filtered before being conducted to the cleaning apparatus, in accordance with well known practice. The filter unit 13 will pick up an increasing amount of contaminating substances and the filter elements will eventually need cleanout. This may be accomplished in conventional manner by reversing the flow, or introduction of air, in accordance with the design of the filter, and not further shown since cleaning of the filter elements form no part of the invention. A valve 18 connected to cleanout tap 17 of the filter is then opened. Valve 18 is connected by means of a pipe 19 to the distillation and settling unit 21 according to the present invention. The mixture withdrawn from the filter 13 will consist of a suspension in solvent of filter sludge including filter powder, dirt, and other contaminating substances. Referring now to Fig. 2 wherein the distillation and settling unit 21 is shown in greater detail, it is seen that the unit consists of an essentially cylindrical vessel 22, forming a chamber and having sheet metal side walls 23. The side walls 23 are preferably ribbed as shown at 24 to provide greater stiffness. Bottom wall plate 25 is likewise of sheet metal. The top of chamber 22 is closed off by means of a superposed condensing unit 26 suitably secured to the vessel 21, for example by means of brackets and screws 27. A gasket 28 seals the vessel 21 and condensing unit 26 tightly together. The top of the condensing unit 26 is closed by a cover 29 which has a tight fit or is secured by means of a gasket and bolt connection so as to prevent the escape of vapors or fumes. Condensing unit 26 is provided with cooling coils 30 and a condensate trough 31 from which the condensate may be let off through outlet 32.

An inlet 35 is provided in the wall 23 of the distillation and settling vessel 21. Inlet 35 is located a slight distance downwardly from the top thereof so as to prevent upward splashing of the liquid entering therethrough. A vent connection 36 is located at substantially the same level as the inlet 35; it may be arranged somewhat higher, but preferably should not be lower than inlet 35. The vent connection 36 prevents escape of vapors due to the turbulence of solvent as it enters through the inlet 35. Vent 36 prevents foaming which may occur during distillation if the substance in vessel 21 contains foaming materials, such as soap, which is sometimes added to dry cleaning solutions. A trap 37 prevents escape of vapors.

Downwardly from the level of inlet 35, the vessel 21 is provided with a draw-off tap 38, normally closed by draw-off valve 39, and is used in the system as will appear more fully below. A sight glass 40 is connected in conventional manner to permit inspection of the level and condition of the solvent in the vessel 21. A liquid drain 41 is located just at the bottom wall of the chamber 22.

The chamber 22 is accessible through a cleanout door 42 closing off the opening having its lower edge even with the bottom wall 25. The cleanout door is normally sealed against the vessel 21 by means of swing out bolts and wing nuts in conventional manner. The whole structure may be supported by means of angle irons 43 or any other convenient and conventional manner.

Provision is made to heat the contents of the vessel, and while heat may be supplied in any convenient form, such as gas burners, electric heaters, or the like, it is customary in the dry cleaning field, where steam is available, to provide steam heat. The vessel 21 is accordingly formed with a steam jacket or steam bottom as shown in detail in Figs. 2 and 3. I have found that by making the steam bottom separately from the remainder of the vessel a savings in material may be had since it is the bottom only which must be capable of withstanding steam pressure. The usual pressures employed may vary over wide ranges, such as from 25 to 100 pounds per square inch. In order to provide an economical construction which may easily be joined to the cylindrical sides of the vessel 21, I prefer to make the steam jacket also of sheet metal. The bottom 25 of vessel 21 forms the top of the steam chamber. It is set into a cupped, or dished plate 45 and welded thereto as shown at 46. The sheet metal side 23 of vessel 21 is then welded to the cupped plate as shown at 47 and 48. Insulation 49 is placed around the vessel 21 to prevent heat loss. Steam is admitted to the jacket through an inlet pipe 50 and taken off through a steam trap 51 and steam return line 52.

Figure 3:
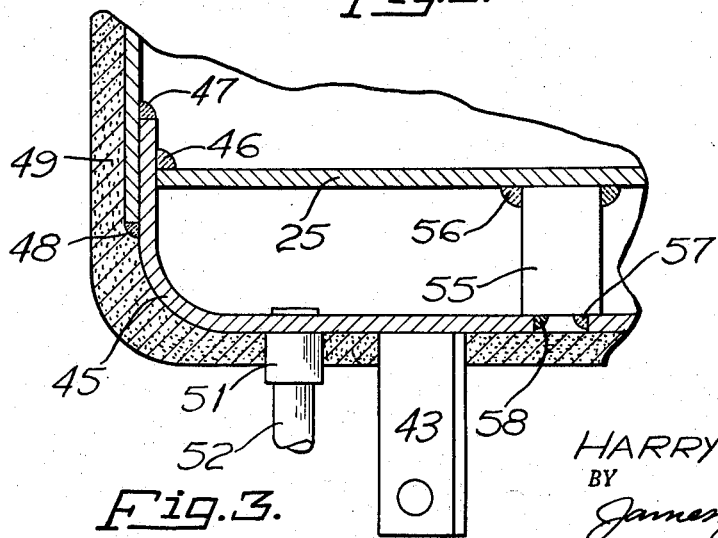
Fig. 3 is a detailed vertical cross sectional view illustrating the assembly of the steam chamber and the component parts thereof.

In order to comply with steam boiler safety regulations, the steam jacket must be provided with internal reinforcing studs 55. These studs are welded on one side circumferentially to the underside of the top of the plate 25, as shown in 56 (Fig. 3). The cupped plate 45 has holes 57 punched or drilled therein, and after assembly of plate 25 into the cupped plate 45, the studs 55 are joined to the cupped plate 45 by welding around the edge of the hole as shown at 58. Preferably the holes 57 are made smaller than the cross sectional outline of studs 55 so that the studs will close off these holes and slight inaccuracies may readily be compensated for.

In actual practice I prefer to manufacture the vessel 21 by first preparing the plate 25. The plate is positioned so as to have its underside facing upwardly, and studs 55 are preliminarily secured to the plate, in accordance with a template. Then the template is removed and the studs are finally and securely welded to the plate as shown at 56. The same template, or a like one, is then used to locate the position of holes 57 drilled or punched into the cupped plate 45, which is then assembled over the plate 25. Thereafter welds 58 and 46 are completed, resulting in a strong unitary structure with a minimum of forming, punching, and drilling operations. It is noted that but one circumferential weld 46 is necessary and all welds are easily accessible and can be made in a horizontal plane thereby simplifying the assembly. Sheet metal side walls 23 are then welded to the bottom, as shown at 47, 48. A slanting top 23a is then welded to side walls 23 and the assembly is complete.

Reverting back to Fig. 1, wherein I have shown the distillation vessel 21 connected into the system it is to be noted that the vent pipe 36 and trap 37 are connected by means of a pipe 60 back to the tank. Any fumes or vapors occurring during filling of the vessel 21 will therefore be vented back into the tank, and escape of noxious gases to the surrounding air is prevented. Alternatively the vent line may also lead to outside air, but in such case some solvent would be lost by evaporation, which is recovered when the system is vented as shown in Fig. 1.

Cooling water for the condenser is supplied through pipe 61; the warmed cooling water is taken off through pipes 62. The condensate is taken from outlet 32 of the condenser and led through pipe 63 to a water separator 64, which may be of conventional design, where the solvent and water present therein are separated. The distilled solvent is then returned to the tank through pipe 65, while the water is taken off and permitted to go to waste as shown at 66. An after cooler 67 may be connected in the pipe 63, and connected to water line 61, 62 as shown in dashed lines to reduce the temperature of the condensate taken from outlet 32.

Steam is supplied to the steam heating chamber through steam line 68 and pressure reducing valve 69. A steam injection line 70 controlled by a valve 71 is connected to a small nozzle 72 leading into the vessel 21, and located somewhat below the draw-off tap 38. This nozzle may be conveniently formed of a piece of tubing about 3 to 5 mm. diameter which has been flattened, for a purpose as will appear hereafter.

In operating the system (referring to Fig. 1), the filter is cleaned in any conventional way to remove the filter cake or sludge, and the cleanout valve 18 is opened as has been explained above. The solvent with sludge and contaminating substances suspended therein will run through pipe 19 and fill chamber 22 of unit 21. Fumes and vapors occurring during the filling operation are returned through vent 36 and trap 37 to tank 10. The filled vessel 22 is left undisturbed for a period of time, usually not less than 3 hours, and preferably overnight. This is sufficient to permit the suspended sludge, dirty filter powder, foreign substances and other particles to settle to the bottom of the vessel 22, and clean solvent may be drained off through tap 38 by opening valve 39. The condition of the solvent may be observed through sight glass 40. In actual practice the cleanout of the filter may be quickly accomplished at the end of the day and the solvent left to stand in vessel 22 over night, clean settled out solvent then being returned through valve 39 at the beginning of the working day next morning, to provide sufficient fluid in tank 10 for operation of the cleaning machines. This procedure may be repeated several times, for example for a total operating time of 24 hours, or until the deposit of sludge and contaminating substances builds up on the bottom plate 25. Before the point has been reached when the fluid drained off through valve 39 is no longer in the desired clean condition, as determined by experience, all clean solvent is withdrawn by opening valve 39, as determined by inspection through sight glass 40. Steam is then turned on by opening valve 69 in the steam line. Cooling water is circulated through pipe 61, 62 and evaporation and distillation of the solvent within the sludge and other deposit on plate 25 will begin. It has been found by experience that the evaporation of solvent will stop after a while; the flow of solvent as determined by inspection of water separator 64 will become a trickle. Further solvent may be recovered by injecting steam into the vessel 22 and simultaneously increasing the evaporation temperature. Valve 71 is accordingly opened for a "steam sweep." The pressure of the steam admitted through nozzle 72 may be low, in the order of 3 to 5 pounds per square inch. Upon admission of steam through the nozzle 72, the flow of solvent will again begin and further distillation of the sludge will continue. When no more condensate is obtained, as determined by inspection of water separator 64, both steam valves may be closed and vessel 22 permitted to cool. The distillation and filter powder may then be removed through door 42, and if the apparatus has been operated in accordance with the foregoing sequence it has been found that the resulting material to be cleaned is powdery in consistency with possibly a slightly caked top, practically odorless, dry, and peeling off easily from the plate 25. This material can be handled easily and disposal thereof presents no problem since it does not leave any dirty residues or present disagreeable or noxious odors.

It is to be noted that the operator of a dry cleaning installation wherein the distillation system according to the present invention is incorporated, is forced to periodically distill some of the solvent used therein, thereby introducing distilled, pure solvent into the system. In systems providing for manual removal of filter sludge, it is possible to continue to use the remaining solvent for long periods. During such time the solvent will not only become contaminated with filter sludge and solid substances, which are removed during filter cleanout, but also with fatty acids, water, and other chemical impurities, which are not removed. The chemical balance and condition of the solvent may then change to such an extent that efficient cleaning of garments is no longer possible, and an inexperienced or inattentive operator may not become aware of this change. In a typical distillation system according to the present invention incorporated in a cleaning installation, about 25 gallons of distilled, pure solvent are returned to the main tank 10 after the sludge accumulating during 24 operating hours is distilled. This is a sufficient amount to keep all of the solvent in good chemical balance with respect to fatty acids, water, and other chemical impurities. It is preferred to so design the capacity of vessel 22 that introduction of undistilled liquid into the installation through tap 38 and valve 39 can properly be made only for 24 operating hours of the cleaning installation, so as to force the operator to distill the remaining sludge every third working day.

The filter capacity may be so chosen that filter cleanouts need be effected only every third day. The solvent is then being left in vessel 22 to settle overnight and after draining off the clean solvent through tap 38, the remainder and the sludge is then distilled. Since every filter cleanout period is then accompanied by distillation of solvent, inexperienced or inattentive operators are automatically provided with clean, pure solvent to keep the total cleaning solvent in the installation in good chemical condition and balance.

It is therefore seen that I have provided a closed filtration and distillation system which permits cleanout of a filter at daily, or other frequent intervals without any handling of dirty or noxious material, yet provides for prompt reuse of the bulk of the fluid used in cleaning the filter itself; further, a closed system with provisions of venting any noxious gases back to the source of supply, which may readily be incorporated into an existing dry cleaning system and which remains totally closed during its entire period of operation. The cover 29 of condensation unit 26 need never be opened except for inspection or repair purposes, since the apparatus is provided within the system with its own valve controlled filling inlet and with a recirculating vent line. The liquid drain 41 is provided merely to permit the draining of solvent from chamber 22 if the chamber is used as a storage tank.

It is further seen that I have provided a steam bottom or steam jacket which may be made entirely of inexpensive materials such as sheet metal and yet comply with the safety regulations necessary for steam vessels. This steam chamber is easy to manufacture with a minimum of machining operations from readily available standard parts.

What is claimed is:

1. In a closed reclamation system for dry cleaning fluids and other fluids forming fumes including filtration, settling, and distillation periods, a fluid supply tank; a fluid pressure pump having a suction side connected to said fluid supply tank, said fluid pressure pump also having a pressure side; a filter connected to said pressure side of said pump, said filter having a cleanout coupling; a unitary distillation and settling unit including a single settling and evaporation chamber and a directly superposed condensing dome and having inlet connection means connected to the filter cleanout coupling; vent means including a trap connected to said settling and evaporation chamber at a level at least as high as that of said inlet connection means and below the condensing dome and further connected back to said fluid supply tank to thereby limit the height of frothing and to return vapors of the fluid occurring during turbulence thereof to said fluid supply tank, a tap off connection located below the level of said chamber inlet connection means and connected to said fluid supply tank; and condensate collection means connected to said fluid supply tank to supply distilled fluid condensate thereto upon distillation within the evaporation chamber.

2. In a closed reclamation system for dry cleaning fluids and other fluids forming fumes including filtration, settling, and distillation periods, a fluid supply tank; a fluid pressure pump having a suction side connected to said fluid supply tank and also having a pressure side; a filter connected to said suction side of said fluid pressure, said filter having a cleanout coupling; a unitary distillation and settling unit including a single settling and evaporation chamber and a directly superposed condensing dome and having inlet connection means connected to said filter cleanout coupling; vent means including a trap connected to said settling and evaporation chamber at a level at least as high as that of said inlet connection means and below the condensing dome to limit the maximum height of frothing, said vent means also being connected back to said fluid supply tank; a tap-off connection located below the level of said inlet connection means and connected to said fluid supply tank condensate collecting means communicating with said condensing dome and including separating means for separating the water and solvent in said condensate from each other; and conduit means leading from said separating means to said fluid supply tank for returning the separated solvent thereto.

3. A closed reclamation system for contaminated fluids and particularly dry cleaning fluids forming fumes or vapors and being subject to frothing, including a fluid supply tank; and a reclamation unit, said reclamation unit comprising a unitary vessel having inlet means to receive contaminated fluids; vent means located at substantially the same level as said inlet means and connected back to said fluid supply tank so as to form a closed vent to prevent escape of fumes or vapors from the system and to provide for pressure equalization within the vessel to prevent frothing; a tap-off connected to the vessel at a level below the inlet means and above the bottom of the vessel and connected to said fluid supply tank means to heat the contents of the vessel; and condensing means superposed on the vessel and connected to said fluid supply tank to supply clean, uncontaminated distilled fluid thereto after distillation of the remainder of the contents of the vessel.

4. A vapor proof unitary settling tank and distillation apparatus particularly for use with dry cleaning fluids forming noxious fumes comprising a vessel having a bottom wall and side walls, a cleanout opening formed therein and a cleanout cover closing said opening; fluid inlet coupling means located at the upper portion of the side walls of the vessel to permit fluid tight and vapor tight coupling of the vessel to a source of fluid supply; vent means including a trap located at substantially the same level as the inlet coupling means, said vent means also being connected back to said source of fluid supply; a draw-off top located at the lower portion of the side wall of said vessel, means in the bottom wall of said vessel to effect heating of the contents of said vessel; and a condensing unit secured in vapor tight relation directly to the top of said vessel and mounted thereon so as to form with said vessel a closed chamber.

References Cited in the file of this patent

UNITED STATES PATENTS

| | | |
|---|---|---|
| 1,440,199 | Wissing | Dec. 26, 1922 |
| 1,791,906 | Savage | Feb. 10, 1931 |
| 1,878,709 | Kerr | Sept. 20, 1932 |
| 1,973,426 | Booth et al. | Sept. 11, 1934 |
| 2,061,350 | Coupier et al. | Nov. 17, 1936 |
| 2,070,204 | Hetzer | Feb. 9, 1937 |
| 2,084,688 | Johnson | June 22, 1937 |
| 2,140,623 | Hetzer | Dec. 20, 1938 |
| 2,153,577 | Levine | Apr. 11, 1939 |
| 2,217,090 | Zerbe | Oct. 8, 1940 |
| 2,270,609 | Smith | Jan. 20, 1942 |
| 2,294,636 | Stearns | Sept. 1, 1942 |
| 2,385,564 | Booth | Sept. 25, 1945 |
| 2,435,201 | Cooperider | Feb. 3, 1948 |
| 2,504,053 | Sweeney et al. | Apr. 11, 1950 |
| 2,574,251 | Dinley | Nov. 6, 1951 |
| 2,652,943 | Williams | Sept. 22, 1953 |
| 2,686,412 | Ricigliand et al. | Aug. 17, 1954 |